US011294923B2

(12) United States Patent
Robison et al.

(10) Patent No.: US 11,294,923 B2
(45) Date of Patent: Apr. 5, 2022

(54) PREEMPTIVE CONNECTION POOL ADJUSTMENTS

(71) Applicant: eBay Inc., San Jose, CA (US)

(72) Inventors: Timothy Robison, Orangevale, CA (US); Sarang Mukund Kulkarni, Folsom, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/200,512

(22) Filed: Mar. 12, 2021

(65) Prior Publication Data

US 2021/0200778 A1 Jul. 1, 2021

Related U.S. Application Data

(63) Continuation of application No. 16/434,121, filed on Jun. 6, 2019, now Pat. No. 10,963,478, which is a continuation of application No. 15/212,066, filed on Jul. 15, 2016, now Pat. No. 10,353,910.

(51) Int. Cl.
*G06F 15/16* (2006.01)
*G06F 16/25* (2019.01)
*H04L 47/70* (2022.01)
*H04L 43/16* (2022.01)
*H04L 43/0894* (2022.01)
*H04L 41/0896* (2022.01)
*H04L 41/5019* (2022.01)
*H04L 43/0876* (2022.01)

(52) U.S. Cl.
CPC .......... *G06F 16/25* (2019.01); *H04L 41/0896* (2013.01); *H04L 41/5019* (2013.01); *H04L 43/0876* (2013.01); *H04L 43/0894* (2013.01); *H04L 43/16* (2013.01); *H04L 47/826* (2013.01)

(58) Field of Classification Search
CPC . G06F 16/25; H04L 43/0894; H04L 43/0876; H04L 43/16; H04L 41/0896; H04L 41/5019; H04L 47/826
See application file for complete search history.

(56) References Cited

U.S. PATENT DOCUMENTS

| | | | |
|---|---|---|---|
| 6,795,445 B1 * | 9/2004 | Kabie | H04L 47/803 370/401 |
| 8,626,890 B2 | 1/2014 | Colrain et al. | |
| 8,688,839 B2 | 4/2014 | Subramanian et al. | |
| 8,732,719 B2 | 5/2014 | Kasten et al. | |

(Continued)

OTHER PUBLICATIONS

Final Office Action received for U.S. Appl. No. 15/212,066, dated Nov. 30, 2018, 20 pages.

(Continued)

*Primary Examiner* — Richard G Keehn
(74) *Attorney, Agent, or Firm* — FIG. 1 Patents

(57) ABSTRACT

Systems and methods for preemptive adjustments of connections in a server connection pool are provided. In example embodiments, a number of quality of service engines analyze server connection pool metrics data to generate instructions to increase or decrease the number of connections in a connection pool, preemptively, before shortages or surpluses of connections occur. Corrective engines can analyze performance of the quality of service engines and can, when necessary, instruct the quality of service engines to modify their prediction mechanisms.

20 Claims, 9 Drawing Sheets

(56) References Cited

U.S. PATENT DOCUMENTS

| | | | | |
|---|---|---|---|---|
| 8,924,381 | B2* | 12/2014 | Trollman | G06Q 10/06 707/732 |
| 9,300,554 | B1* | 3/2016 | Kosai | G06F 16/24578 |
| 10,353,910 | B2 | 7/2019 | Robison et al. | |
| 10,963,478 | B2 | 3/2021 | Robison et al. | |
| 2003/0198241 | A1* | 10/2003 | Putcha | H04L 49/3081 370/419 |
| 2003/0208523 | A1 | 11/2003 | Gopalan et al. | |
| 2004/0088413 | A1* | 5/2004 | Bhogi | G06F 9/5061 709/226 |
| 2006/0015618 | A1 | 1/2006 | Freimuth et al. | |
| 2007/0136311 | A1* | 6/2007 | Kasten | H04L 67/28 |
| 2008/0104138 | A1* | 5/2008 | Provo | G06F 9/4843 |
| 2009/0292953 | A1* | 11/2009 | Barghouthi | G06F 11/1443 714/40 |
| 2010/0058455 | A1* | 3/2010 | Irudayaraj | H04L 63/20 726/11 |
| 2011/0099293 | A1* | 4/2011 | Ait-Ameur | H04L 29/12283 709/245 |
| 2012/0054514 | A1* | 3/2012 | Barsness | G06F 16/903 713/320 |
| 2014/0310714 | A1* | 10/2014 | Chan | G06F 16/285 718/102 |
| 2014/0324911 | A1* | 10/2014 | de Lavarene | G06F 16/90 707/781 |
| 2015/0215464 | A1* | 7/2015 | Shaffer | H04M 3/5238 379/266.06 |
| 2015/0244774 | A1* | 8/2015 | Jang | H04L 67/148 709/203 |
| 2015/0341428 | A1 | 11/2015 | Chauhan | |
| 2016/0164980 | A1* | 6/2016 | Kulkarni | G06F 9/5022 707/770 |
| 2016/0182401 | A1* | 6/2016 | Dick | H04L 47/803 709/226 |
| 2016/0314482 | A1* | 10/2016 | Basu | G06Q 30/0251 |
| 2016/0321147 | A1* | 11/2016 | Kizhakkiniyil | G06F 11/3051 |
| 2016/0321548 | A1* | 11/2016 | Ziskind | G06Q 30/0281 |
| 2018/0019922 | A1 | 1/2018 | Robison et al. | |
| 2018/0225344 | A1* | 8/2018 | Fang | G06F 21/62 |
| 2019/0361903 | A1 | 11/2019 | Robison et al. | |

OTHER PUBLICATIONS

Non-Final Office Action Received for U.S. Appl. No. 15/212,066 dated May 9, 2018, 19 pages.

Notice of Allowance received for U.S. Appl. No. 15/212,066, dated Mar. 14, 2019, 8 pages.

Non Final Office Action Received for U.S. Appl. No. 16/434,121, dated Apr. 14, 2020, 22 Pages.

Notice of Allowance received for U.S. Appl. No. 16/434,121, dated Nov. 30, 2020, 10 Pages.

* cited by examiner

PREEMPTIVE CONNECTION POOL ADJUSTMENTS

CROSS-REFERENCE TO RELATED APPLICATION

This application is a continuation of, and claims priority to, U.S. application Ser. No. 16/434,121, filed Jun. 6, 2019, entitled "Preemptive Connection Pool Adjustments" which claims priority to U.S. Pat. No. 10,353,910, issued on Jul. 16, 2019, from U.S. application Ser. No. 15/212,066, filed Jul. 15, 2016, and entitled "Preemptive Connection Pool Adjustments," the disclosures of which are herein incorporated by reference in their entirety.

TECHNICAL FIELD

Example embodiments of the present disclosure relate generally to network connection pool management and, more particularly, but not by way of limitation, to preemptive adjustments of a database connection pool.

BACKGROUND

Some network architectures use connection pools to collect and manage connections to network components that have finite connection capabilities. One such architecture includes database architectures, which use database connection pools to manage connections to a database server. As applications execute, they may execute code to retrieve data from a database. The code may include a database connection request. A database server may receive the request and provide, from a connection pool, an open connection to the database if one is available. If none are available, the database server may create a new connection and provide it to the application for access to the database. One issue with the conventional approach is that creating a new connection on the fly (e.g., in response to a request for an open connection), when none are available, can create low performance database access; as more connections are added, more strain is added on the database server. A cap may be implemented to save the server from strain; however, the cap is still reactionary, and once the cap is reached, database connection requests may have to wait for a database connection to become available, which further worsens database performance and application performance. As is evident, there is demand for improved access to databases.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative example embodiments of the disclosure. In the following description, for the purposes of explanation, numerous specific details are set forth in order to provide an understanding of various example embodiments of the inventive subject matter. It will be evident, however, to those skilled in the art, that example embodiments of the inventive subject matter may be practiced without these specific details. In general, well-known instruction instances, protocols, structures, and techniques are not necessarily shown in detail.

In various example embodiments, a system for preemptive connection pool adjustments that can handle shortages and surpluses of database connections before they occur can be implemented using one or more quality of service engines and correction engines to modify the quality of service engines. The quality of service engines are configured to modify the number of connections in a database connection pool proactively through analysis of connection pool metrics data, instead of waiting for a shortage or surplus of connections to happen and then making corrections to the pool by opening or closing database connections. In some example embodiments, the quality of service engines include a wait time engine, a load level engine, and a throttle engine. Briefly, the wait time engine is configured to use the time it takes for a connection request to receive a database connection as a quality of service parameter, and modify the number of connections in a database connection pool if a shortage or surplus of database connections occurs. The load level engine back solves a load level formula to determine an appropriate number of connections in a pool, identifies the number of connections currently in the pool, and opens or closes connections so that the current number of connections approximately matches the appropriate number of connections. The throttle engine is configured to detect too many connections being created and throttles them in steps or per a rate to alleviate database stress. The correction engines can detect violations of the quality of service using the magnitude of a violation or frequency of violations to make corrections to the number of connections in the pool or instruct the quality of service modules to change their performance parameters, as explained in further detail below.

Figure 1:
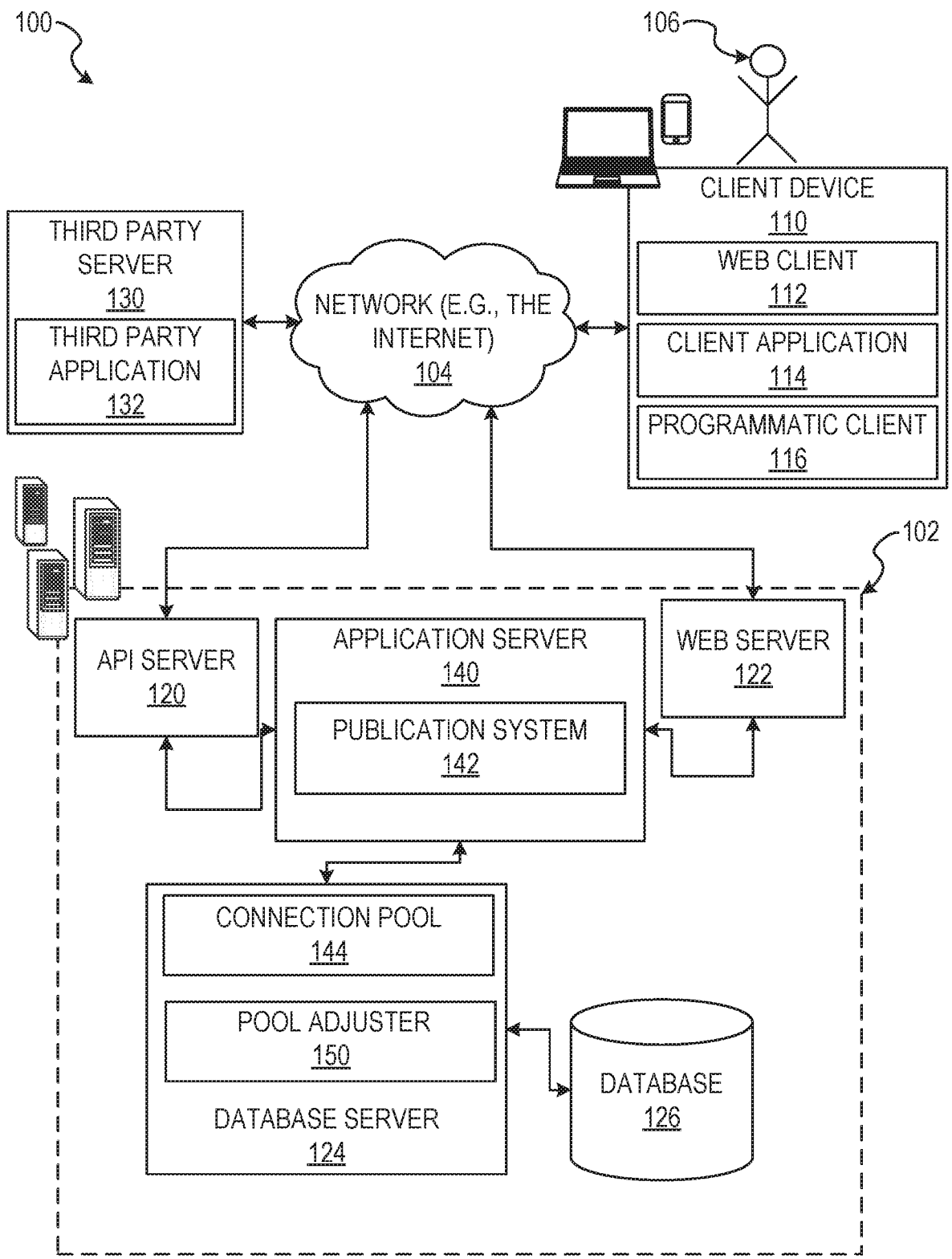
FIG. 1 is a block diagram illustrating a networked system, according to some example embodiments.

With reference to FIG. 1, an example embodiment of a high-level client-server-based network architecture 100 is shown. A networked system 102 provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser), and a client application 114, and a programmatic client 116 executing on the client device 110. The client device 110 includes the web client 112, the client application 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone. Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, and e-commerce site apps. In some implementations, the client application 114 include various components operable to present information to the user and communicate with networked system 102. In some example embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely, if the e-commerce site application is not included in the client device 110, the client device 110 can use its web browser to access the e-commerce site (or a variant thereof) hosted on the networked system 102.

The web client 112 accesses the various systems of the networked system 102 via the web interface supported by a web server 122. Similarly, the programmatic client 116 and client application 114 accesses the various services and functions provided by the networked system 102 via the programmatic interface provided by an Application Program Interface (API) server 120. The programmatic client 116 can, for example, be a seller application (e.g., the Turbo Lister application developed by EBAY® Inc., of San Jose, Calif.) to enable sellers to author and manage listings on the networked system 102 in an off-line manner, and to perform batch-mode communications between the programmatic client 116 and the networked system 102.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110, and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, one or more application server 140. The application server 140 can host one or more publication system 142, database connection pool system 144, and a pool adjuster 150, each of which comprises one or more modules or applications and each of which can be embodied as hardware, software, firmware, or any combination thereof. The application server 140 are, in turn, shown to be coupled to one or more database server 124 that facilitate access to one or more information storage repositories or database 126. The database server 124 can comprise a connection pool having a number of database connections, including open connections and connections in use. Different network components, including a third party application 132, client application 114, and/or the publication system 142 may transmit database connection requests to database server 124. If connections are available in the connection pool system 144, the database server serves the open connections to the request applications, which may use the connections to retrieve query data from databases 126, managed by the database server 124. The pool adjuster 150 can comprise a number of engines, each of which can be embodied as hardware, software, firmware, or any combination thereof. In an example embodiment, the database 126 are storage devices that store information to be posted (e.g., publications or listings) to the publication system 142. The database 126 also stores digital good information in accordance with some example embodiments.

Additionally, a third party application 132, executing on third party server 130, is shown as having programmatic access to the networked system 102 via the programmatic interface provided by the API server 120. For example, the third party application 132, utilizing information retrieved from the networked system 102, supports one or more features or functions on a website hosted by the third party.

The publication system 142 provides a number of publication functions and services to the users that access the networked system 102. While the publication system 142 are shown in FIG. 1 to both form part of the networked system 102, it will be appreciated that, in alternative example embodiments, each system 142 may form part of a service that is separate and distinct from the networked system 102. Further, in some example embodiments, the components and logical functionality of the pool adjuster 150 may be integrated into a server that is separate and distinct from the database server 124, or alternatively, may be integrated into existing servers, such as application server 140.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the application server 140 (e.g., the publication system 142) can also be implemented as standalone software programs, which do not necessarily have networking capabilities.

Figure 2:
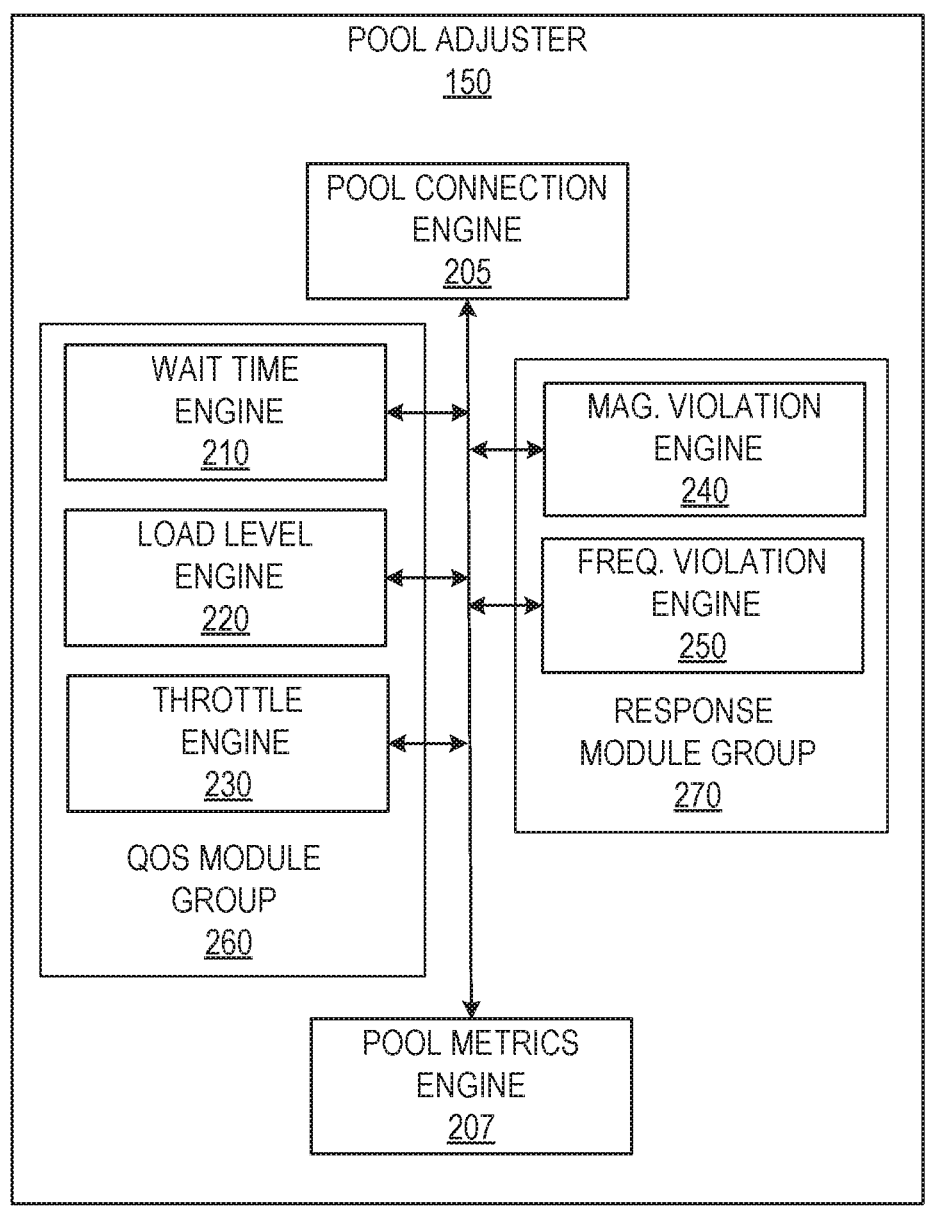
FIG. 2 is a block diagram showing example components provided within the system of FIG. 1, according to some example embodiments.

FIG. 2 illustrates a block diagram showing components provided within the pool adjuster 150, according to some example embodiments. The pool adjuster 150 can stored on non-transitory memory of a hosting system (e.g., database server 124), or may be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data.

FIG. 2 illustrates components of the pool adjuster 150, according to some example embodiments. As illustrated, the pool adjuster 150 may comprise a pool connection engine 205, a quality-of-service (QOS) module group 260 and a response module group 270.

The pool connection engine 205 receives incoming database connection requests from applications (e.g., publication system 142, client application 114) and adds or terminates open database connections in a connection pool based on demand or instructions from the other modules. In at least one example embodiment, the pool connection engine 205 receives inputs from the QOS module group 260 and the response module group 270 and modifies the number of open database connections in a connection pool based on the received inputs form the groups.

A pool metrics engine 207 records metrics describing the database connections and stores the recorded metrics as connection pool metrics data. The connection pool metrics data includes wait time data, connection use time data, and request frequency data, according to some example embodiments. The wait time data describes how long past database connection requests had to wait before being serviced by the pool connection engine (e.g., how long a connection request waited before receiving a database connection). The connection use time data describes how long past database connections were open or used by an application. The request frequency data describes the rate at which incoming database connection requests are received from the applications.

The QOS module group 260 is responsible for monitoring database connection requests, analyzing connection pool metrics, and generating instructions for the pool connection engine 205 to open, close, or throttle the amount of newly created connections. As illustrated, the QOS module group 260 comprises a wait time engine 210, a load level engine 220, and a throttle engine 230.

Each of the modules is discussed in further detail below, but is explained here briefly in a high-level manner. The wait time engine 210 determines whether the time that past database connection requests waited before being serviced surpasses a wait time threshold. If the wait time threshold is exceeded, the wait time engine 210 instructs the pool connection engine 205 to create new database connections. The load level engine implements an equilibrium equation that uses database connection traffic density to calculate a load level. If the load level limit is exceeded, the load level engine 220 instructs the pool connection engine 205 to create new database connections. The throttle engine 230 works as a type of safeguard against too many new connections being created at a time. For example, according to one example embodiment, the throttle engine analyzes the number of new connections being ordered open by the wait time engine 210 and load level engine 220 and throttles the amount of connections being opened in steps, thereby alleviating an overloaded database instance.

The response module group 270 are responsible for correcting inefficient predictions and/or handling of new database connections as ordered by modules of the QOS module group 260.

As illustrated, the response module group 270 comprises a magnitude violation engine 240 and a frequency violation engine 250. Generally, applications requesting database connections may subscribe to different quality-of-service or service-level agreements (SLAs), whereby developers/administrators of the applications may pay increasingly more money for increasingly higher performance database access. In some implementations, the quality of service may be arranged in levels, for example, bronze level database access, silver level database access, and gold level database access, where silver level access applications are assured better database performance than bronze level access applications, and gold level access applications are assured better database performance than applications subscribed to the silver and gold levels. Although three levels are discussed as an example here, it is appreciated that any number of levels and granularity can be implemented in a similar manner.

The magnitude violation engine 240 is configured to determine whether QOS levels for applications are being violated and by how much (e.g., by what magnitude). If QOS violations of significant magnitude are found in the metrics data, the magnitude violation engine 240 instructs the wait time engine 210, load level engine 220, and throttle engine 230 to take corrective actions (e.g., by lowering the wait time threshold, lowering the load level, and by increasing the amount of throttling, respectively).

The frequency violation engine 250 is configured to determine whether QOS levels for applications are frequently being violated. For example, while a single large magnitude violation may not have occurred, a number of small violations may have occurred over a small period of time.

Repetitive violations, however large the size, can signify that the connection creation/termination instructions ordered by the QOS modules is inefficient or problematic. Responsive to determining that too many QOS violations are occurring in too small an amount of time, the frequency violation engine 250 may instruct the QOS module group 260 to take corrective actions (e.g., by lowering the wait time threshold, lowering the load level, and increasing the amount of throttling).

Figure 3:
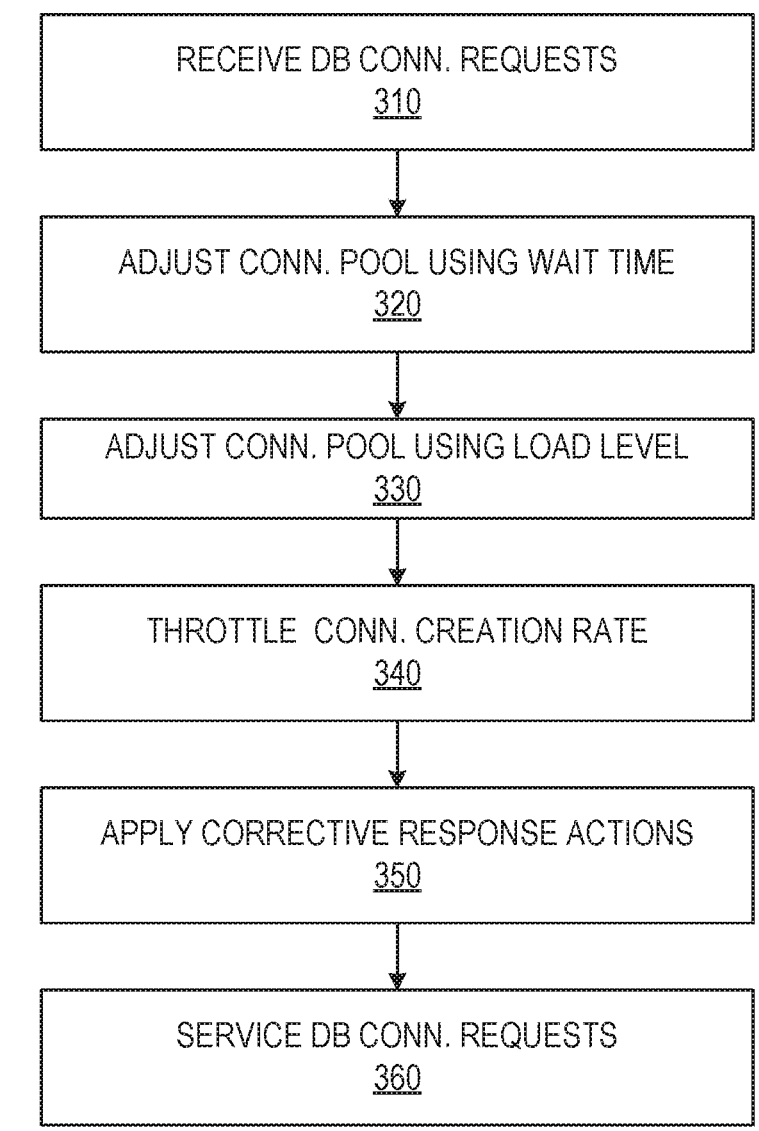
FIG. 3 is a flow chart illustrating an example method for preemptive connection pool adjustments, according to some example embodiments.

FIG. 3 illustrates a flow chart 300 for a method for implementing preemptive database connection pool adjustments, according to some example embodiments. At operation 310, the pool adjuster 150 receives database connection requests from applications. At 320, the wait time engine 210 analyzes wait time data from the connection pool metrics data. The wait time engine 210 determines whether a wait time QOS level has been exceeded. If the wait time QOS threshold has been exceeded, the wait time engine 210 instructs the pool connection engine 205 to create more open connections in the database connection pool, and, if necessary, initiate more database instances to service the increased amount of database connections in the pool.

In some example embodiments, where the wait times are very low, the wait time engine 210 may instruct the pool connection engine 205 to close database connections that are currently open in the pool in order to save resources.

At operation 330, the load level engine 220 analyzes the connection pool metrics data and computes an optimal load level for how many database connections should be in the connection pool. The load level engine 220 then instructs the pool connection engine to close connections if the load level is being surpassed (e.g., the load level is surpassed if there are too many open connections in the pool and not that that many database connection requests). The load level engine 220 can also instruct the pool connection engine 205 to open more connections if the load level is not being met (e.g., too many connection requests and not enough open connections).

At operation 340, the throttle engine 230 can throttle down the number of database instances being created in the connection pool. Creating too many database connections at once can overburden database instances. The throttle engine 230 is configured to safe guard against overburdening a database instance or instances by allowing creation of new connections to happen in steps, instead of all-at-once.

At operation 350, the response module group 270 analyzes recently created pool metrics data for the connection pool and determines whether any violations of QOS limits are occurring. As explained, violations of QOS limits may be identified by the magnitude of single violations or the frequency of the violations. After determining that the QOS limits are being violated, the response module group 270 issues corrective response actions to the QOS module group 260. In some example embodiments, the response actions are instructions to increase or decrease respective thresholds and limits being used in the QOS module group 260. For example, the wait time QOS threshold may be at an initial level, according to initial configuration or out-of-the-box configurations. However, if QOS violations are still occurring, the wait time QOS threshold may be lowered further, to ensure that connection requests do not have to wait long for open connections to be available. Similarly, corrective actions for the other engines include increasing the load level limit for the load level engine 220 and increasing the size of each step or the amount of time before the next step is reached (in the throttle engine 230).

At operation 360, the database connection requests are serviced by providing open connections to the applications. In contrast to past approaches which create new open connections in the pool if there are none available, the method of FIG. 3 proactively manages the number of connections in the pool to preempt database connection shortage issues.

Figure 4:
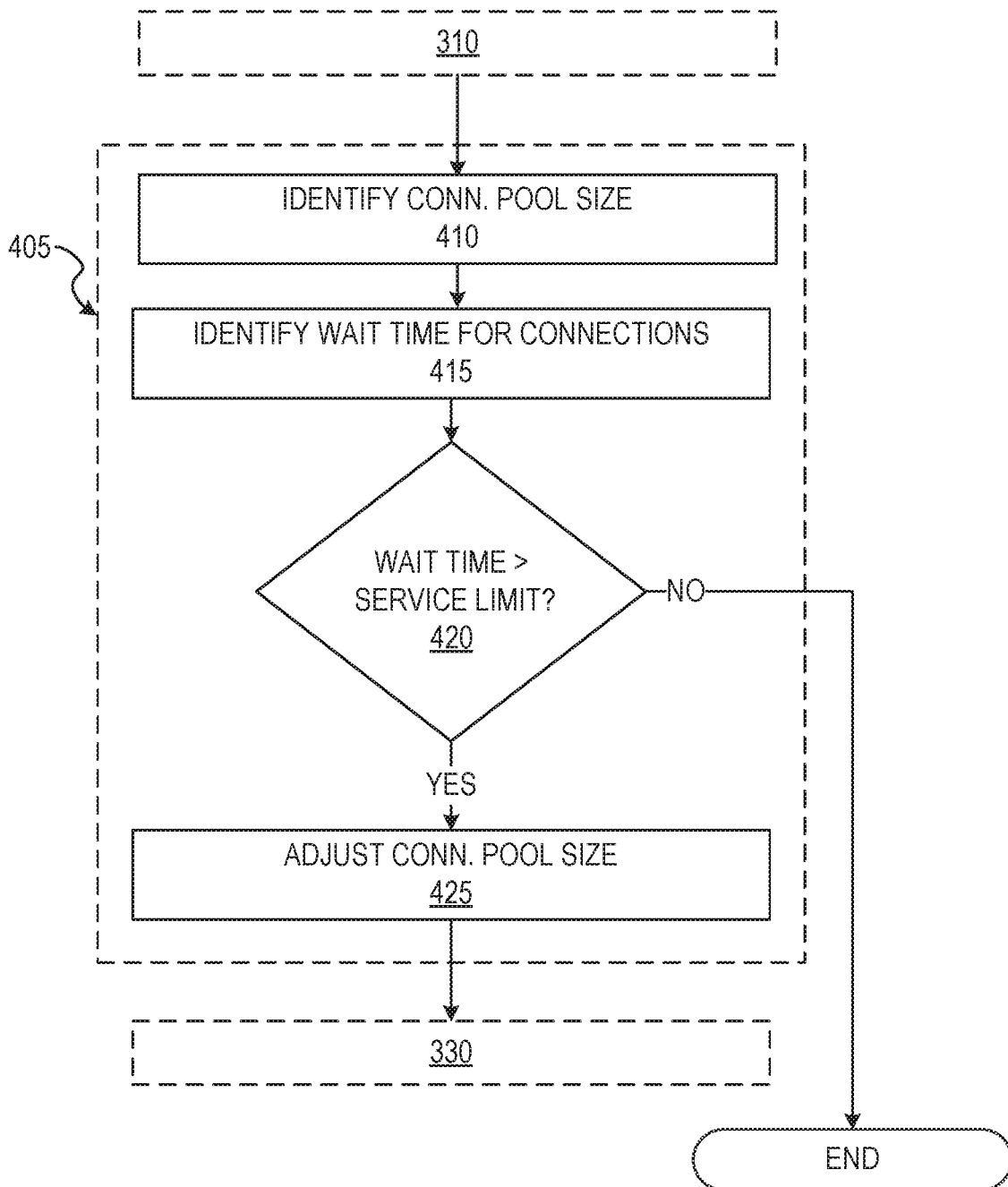
FIG. 4 is a flow chart illustrating an example method for preemptive pool adjustments using wait time parameters, according to some example embodiments.

FIG. 4 shows a flowchart of a method 405 for implementing wait time quality-of-service adjustments to a database connection pool, according to some limits. As illustrated, the operations in method 405 may be implemented as a subroutine between operations 310 and 330 (see FIG. 3). The method 405 implements wait time, which is the time a database connection request waits before receiving an open connection to use, as a QOS metric. As previously discussed, the amount of time that database connections must wait is recorded and stored as connection pool metrics data. Wait time data is one of the data items that may be recorded for each new incoming connection request. The process may start with the wait time engine 210 identifying the current connection pool size, at operation 410. For example, the wait time engine 220 may identify how many open connections are currently in the database pool. At operation 415, the wait time engine 210 identifies the current wait time for recently received connection requests. At operation 420, the wait time engine 210 determines whether the wait time metrics for the recently received requests surpass or exceed the QOS wait time service limit. If the wait time of the database connections is greater than the wait time QOS limit, then at operation 425, the wait time engine 210 instructs the pool connection engine 205 to create more open connections in the connection pool and/or instantiate more database instances. However, if the wait time limits for recent connection requests do not exceed the wait time QOS limit, then the operation ends and no adjustment of the pool by the wait time engine 210 is performed.

In some example embodiments, if a single connection request exceeds the wait time limit, the wait time engine 210 will issue instructions to create new open connections in the pool. In some example embodiments, a specified number of connection requests must violate the wait time QOS limit before the wait time engine 210 issues open connection requests. In some example embodiments, the magnitude of a wait time violation must be of a certain amount before a positive determination occurs at operation 420. For example, if the wait time limit is set to 0.5 seconds, the wait time engine 210 may require that the wait time limit must be exceeded tenfold before issuing a new connection creation request. Thus, a connection request waiting 10 seconds for a connection request would trigger the wait time engine 210 to create new connections.

Figure 5:
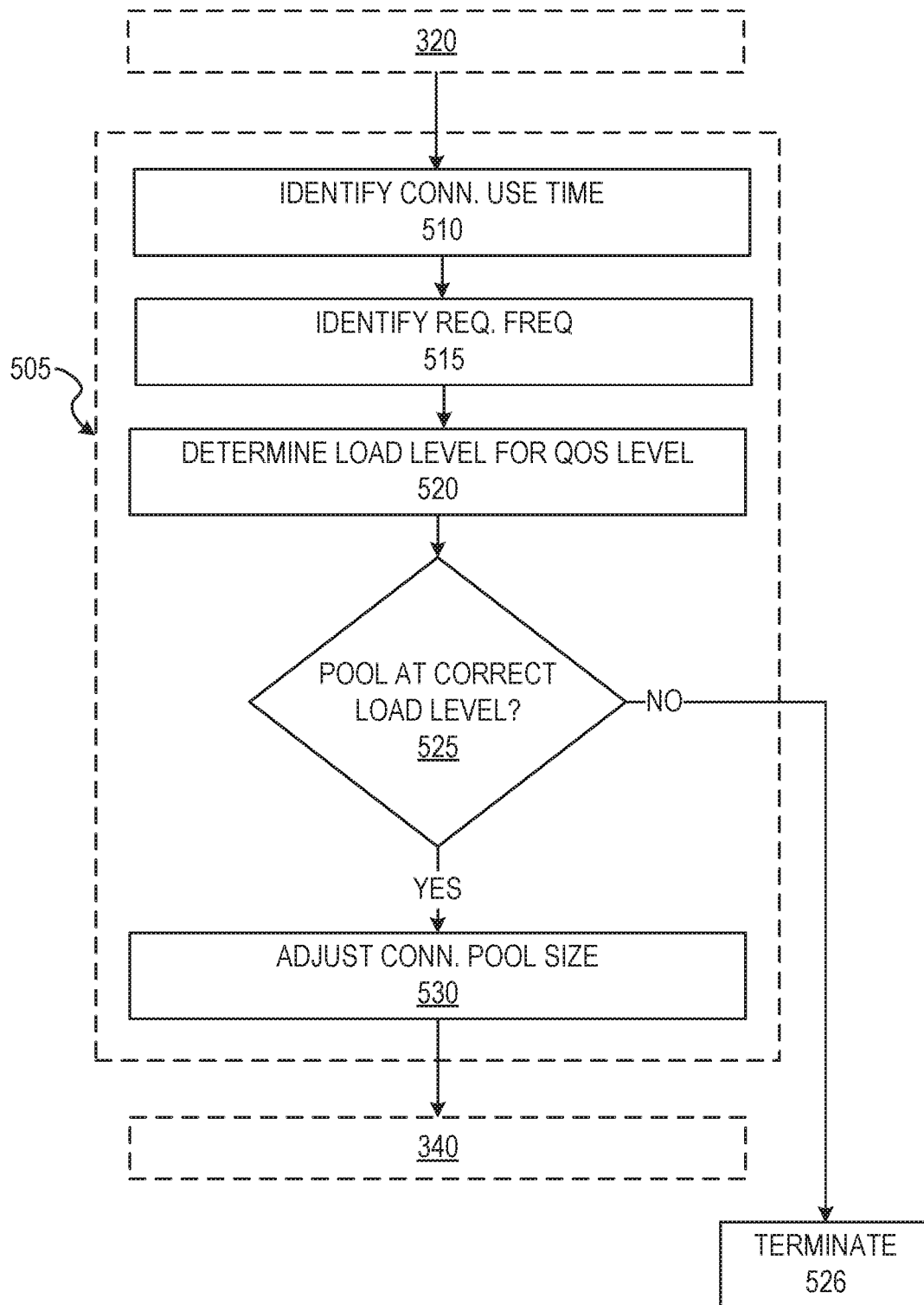
FIG. 5 is a flow chart illustrating an example method for preemptive pool adjustments using load level based adjustments, according to some example embodiments.

FIG. 5 shows a flowchart of a method 505 for implementing load level based QOS adjustments to a database connection pool, according to some example embodiments. As illustrated, the operations in method 505 may be implemented as a subroutine between operations 320 and 340 (see FIG. 3). The operations in method 505 proactively adjust the number of database connections in the connection pool before a shortage happens by determining an optimal load level for the connection pool and opening or closing connections to read the load level.

At operation 510, the load level engine 220 identifies or accesses the connection use time data from the connection pool metrics data. The connection use time data describes how long past database connections were used. At operation 515, the load level engine 220 identifies or accesses the request frequency data from the connection pool metrics data. The request frequency data describes the rate at which incoming database connections are being received.

At operation 520, the load level engine 220 generates the optimal load level for the connection pool under consideration. In some example embodiments, the optimal load level is an output of an Erlang C calculation, which conventionally uses the number of customer service representatives available and the rate of incoming calls as inputs. However, in place of customer service representatives, the load level engine 220 uses the number of open connections in a connection pool as an Erlang C input, and in place of the rate of incoming calls, the load level engine 220 uses the rate of incoming database connection requests as an Erlang C input.

In order to generate the current load level for the connection pool, the load level engine generates a connection concentration metric from the number of open connection data and the rate of connection request metrics. The connection concentration metric describes the concentration of database connection use and is generated by multiplying the connection use time by the rate of incoming database connection requests. The load level engine 220 may further generate a connection load distribution to input into the Erlang C formula. The connection load distribution describes the total load distributed across the amount of open connections. The connection load distribution is calculated by the load level engine 220 by dividing the connection concertation metric by the number of currently open database connections in the database pool.

Once the connection use time, the rate of incoming database requests, the connection concentration metric, and the connection load distribution are known, the load level engine 220 inputs the values into the Erlang C formula to generate the current load level for the connection pool. The Erlang C can be used to determine theoretical wait times given the current load level of the connection pool. As described, assured wait times can be specified per SLA level as a QOS metric. If a given pool is a part of a gold level SLA, with a likely assured low wait time, then at operation 525, the load level engine 220 determines whether the current load level exceeds the gold level SLA wait time. If the current load level wait time does not exceed the SLA wait time, then the operation terminates at 526. Alternatively, if the current load level wait time exceeds the gold level SLA, then at operation 530 the load level engine 220 instructs the pool connection engine 205 to increase the number of database connections. The number of database connections to be created in the connection pool may be determined by the load level engine 220 by defining the desired load level in the Erlang C formula and letting the number of open connections be a variable, then back-solving for the variable, thereby determining the appropriate amount of open connections.

In contrast to other approaches, the load level engine 220 is configured to preemptively manage the number of connections in a pool by closing connections when the load level is in surplus (too many connections are opened), and creating new connections when the load level is exceeded.

Figure 6:
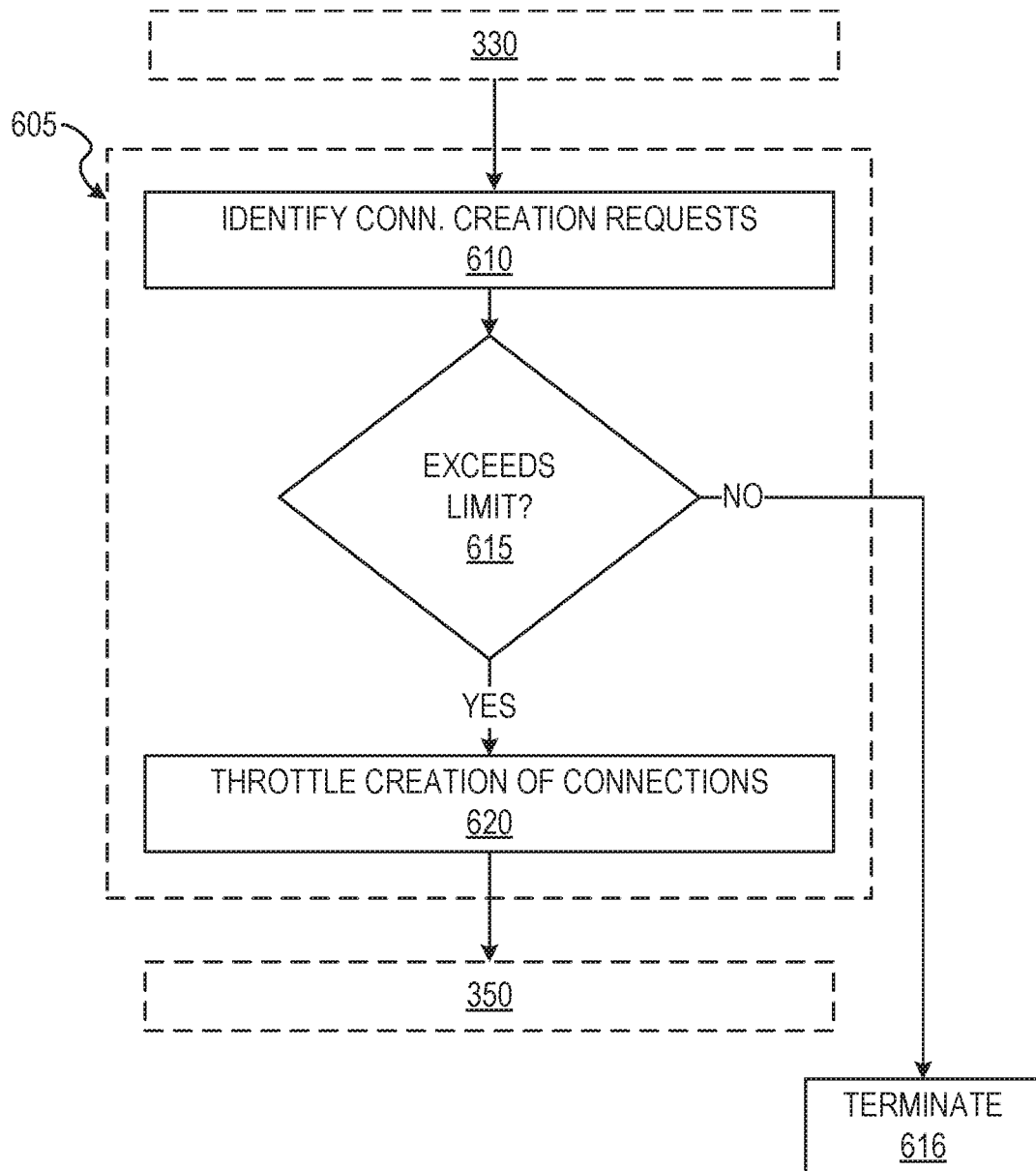
FIG. 6 is a flow chart illustrating an example method for preemptive pool adjustments using throttling of connection creation, according to some example embodiments.

FIG. 6 shows a flowchart of a method 605 for implementing throttling creation of database connections, according to some example embodiments. As illustrated, the operations in method 605 may be implemented as a subroutine between operations 330 and 350 (see FIG. 3). Creating too many database connections at once can strain a database, causing it to underperform and potentially crash. Too many connection requests may occur naturally due to application work flows, or may be caused by wait time engine 210 and load level engine 220 requesting too many new connections be created at the same time. The throttle engine 230 can implement method 605 in order to safe guard against too many connection requests putting undue strain on the database.

At operation 610, the throttle engine 230 identifies the current connection creation rate. At operation 615, the throttle engine 230 determines whether the identified rate exceeds a creation rate limit. If the current creation rate does not exceed the rate limit, then no throttling occurs and the method ends at operation 616. However, again reference to operation 615, if the current creation rate exceeds a creation rate limit throttling is implemented to slow down or pause connection creation, as illustrated at operation 620.

For example, the throttle engine 230 may identify the current rate limit as 5 database connection creations allowed per minute, and further determine from operation 610 that the current rate of connection creation to be 30 connections per minute. Then at operation 615, the throttle engine 230 determines that the current 30 connections per minute being created exceeds the rate limit of 5 database connection creations per minute. Accordingly, at operation 620 the throttle engine 230 throttles the amount of connections created so that the current creation rate is below the threshold rate.

In some embodiments, if the total number of connections to be created (e.g., connection creations outstanding) surpasses a creation limit, the throttle engine 230 may initiate connection creation throttling. For example, in some example embodiments, the throttle engine 230 comprises a bulk connection creation limit, such as 30 connection creation requests. At operation 610, the throttle engine 230 may, for example, identify that 100 database connection requests have been received and are currently waiting for a connection (e.g., 100 connection creations outstanding). At operation 615, the throttle engine 230 determines that the 100 outstanding connection to be created exceeds the 30 bulk connection creation limit. At operation 620, in response to determining that the limit is exceeded, the throttle engine 230 throttles the 100 connections. In some embodiments, the 100 connections are throttled in steps. For allowing 10 connections to be created, then letting 1 minute pass, then allowing 10 further connections to be created, etc., until all connection requests receive connections.

Figure 7:
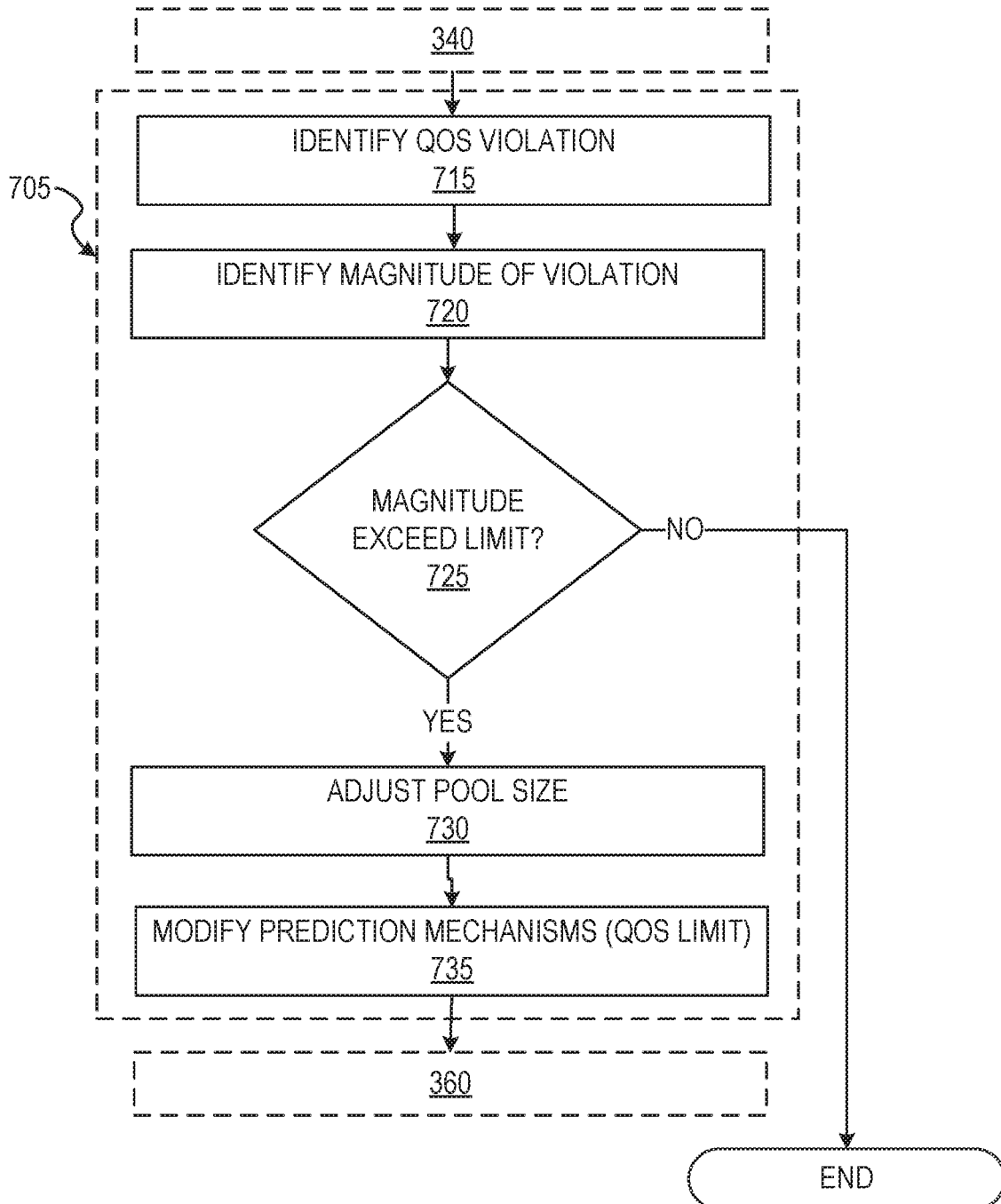
FIG. 7 is a flow chart illustrating an example method for preemptive pool adjustments using magnitude violation based corrective actions, according to some example embodiments.

FIG. 7 shows a flowchart of a method 705 for implementing magnitude violation based corrections of the number of connections in a connection pool, according to some example embodiments. As illustrated, the operations in method 705 may be implemented as a subroutine between operations 340 and 360 (see FIG. 3). At 715, the magnitude violation engine 240 identifies a QOS violation from historical data recorded in the connection pool metrics data. At operation 720, the magnitude of the violation is determined. For example, if the QOS limit is 5 second wait times, and a 30 second wait time is identified, the magnitude of the violation is then 25 seconds. At operation 725, the magnitude violation engine 240 determines whether the identified violation magnitude exceeds a magnitude limit. For example, if the QOS level is 3 seconds, the magnitude limit may be three times the QOS level, and thus 9 seconds. If the magnitude limit is not exceeded, then method 705 exits and ends. If the magnitude violation is exceeded, then at 730 the magnitude violation engine 240 may instruct the pool connection engine 205 to create more connections, thereby immediately alleviating the potential wait times. Optionally or alternatively, at operation 735, the magnitude violation engine 240 instructs the engines in the QOS group to increase their parameters to attain better performance. For example, the wait time engine 210 may lower the wait time threshold from 5 seconds to 2 seconds. The load level engine 220 may adjust the target load level and back solve for the proper number of open database connections, and the throttle engine 230 may increase the amount of throttling (e.g., decreasing the allowed connection rate, or the amount of connections created in steps, as described above).

Figure 8:
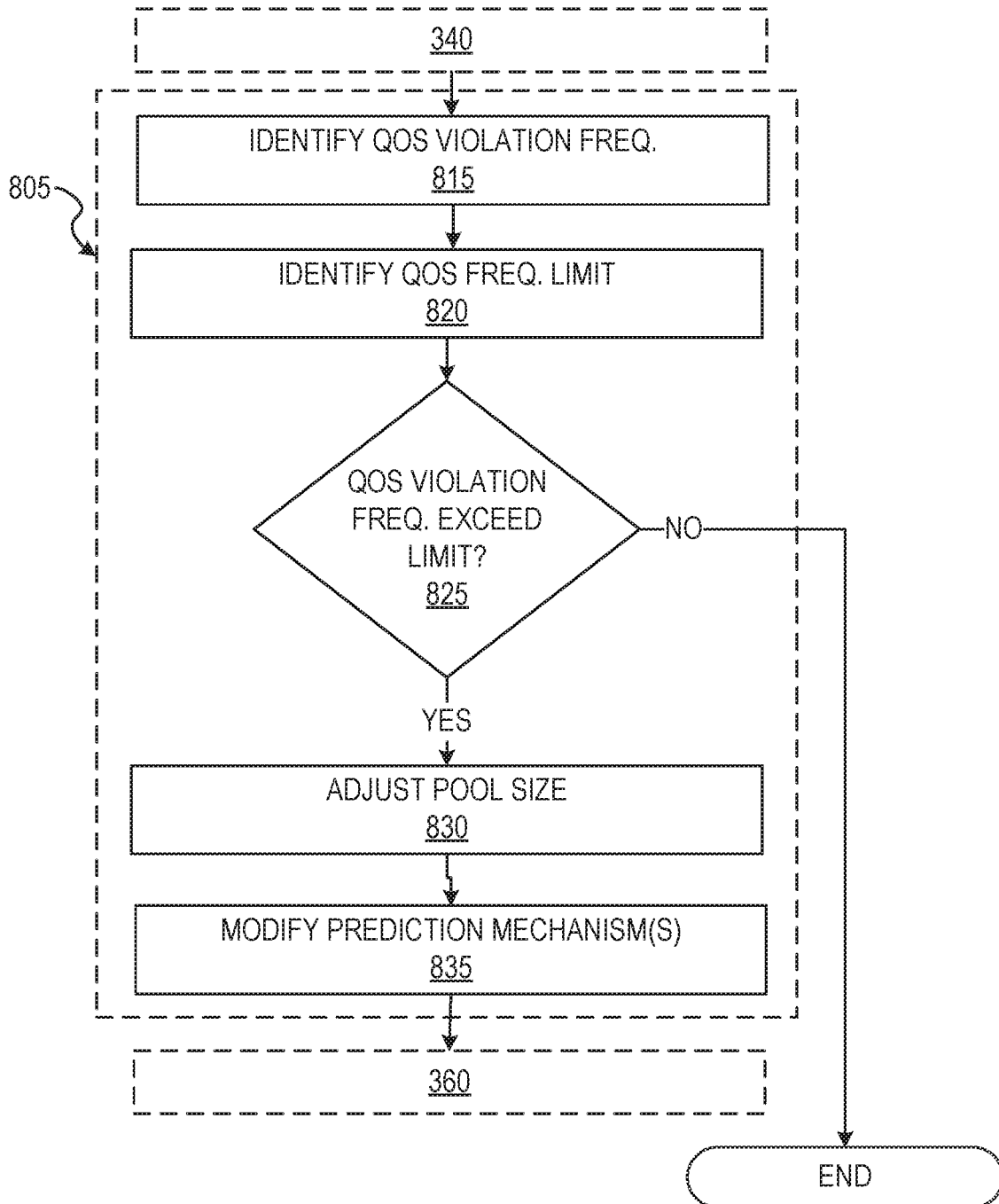
FIG. 8 is a flow chart illustrating an example method for preemptive pool adjustments using frequency violation based corrective actions, according to some example embodiments.

FIG. 8 shows a flowchart of a method 805 for implementing frequency violation based corrections of the number of connections in a connection pool, according to some example embodiments. As illustrated, the operations in method 805 may be implemented as a subroutine between operations 340 and 360 (see FIG. 3). At operation 815, the frequency violation engine 250 identifies a number of QOS violations that occurred within a duration of time (e.g., 10 seconds). At operation 820, the frequency violation engine 250 identifies a preconfigured QOS frequency violation limit or interval set per the specified QOS or SLA. For example, for a gold level SLA, the frequency violation limit may be 3 per minute; that is, no more than three violations of the QOS parameters may occur per minute, regardless of magnitude. At operation 825, the frequency violation engine 250 determines whether the identified QOS violations occurred within the specified limit. If the violations did not occur within the specified limit, then method 805 exits and ends. If the violations did occur within the specified limit, then at operation 830, the frequency violation engine 250 may instruct the pool connection engine to create more open connections in the pool.

Optionally or alternatively, at operation 835, the frequency violation engine 250 instructs the engines in the QOS module group 260 to increase their parameters to attain better performance. For example, the wait time engine 210 may lower the wait time threshold from 5 seconds to 2 seconds. The load level engine 215 may adjust the target load level and back solve for the proper number of open database connections, and the throttle engine 230 may increase the amount of throttling (e.g., decreasing the allowed connection rate, or the amount of connections created in steps, as described above).

In some example embodiments, the frequency violations are identified by implementing a sliding window that has a width of the frequency violation limit. For example, if the frequency violation limit is three minutes, the sliding window may be three minutes long. The historical data may be scanned using the sliding window by sliding the window along the historical data, thereby removing connections and adding connections while maintaining the window width. In some example embodiments, the sliding window may be performed using discrete convolution. When more then the preconfigured amount of violations occurs within the window, a positive determination may occur at operation 825, new connections may be created at operation 830, and QOS modules may increase performance parameters at operation 835.

Figure 9:
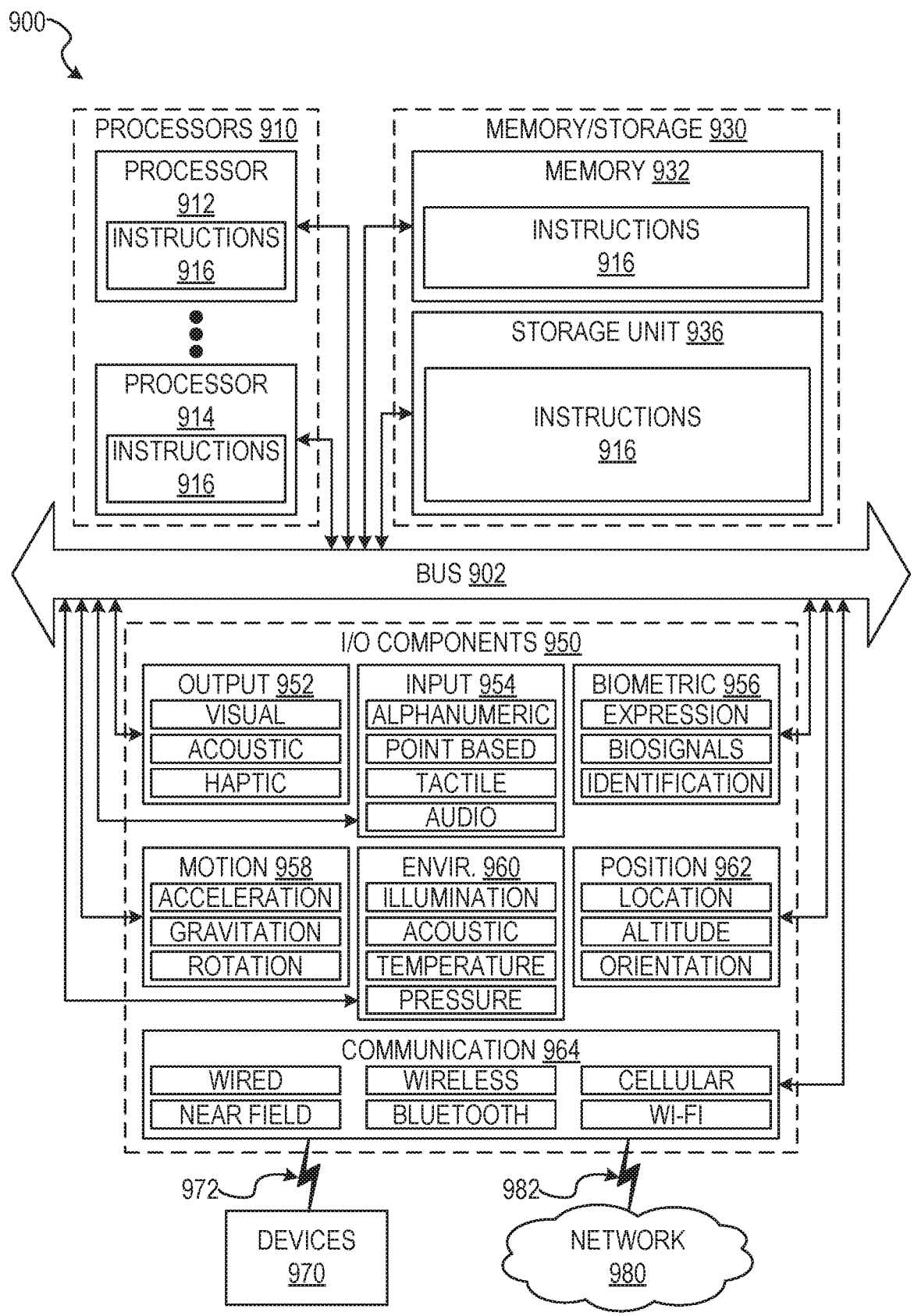
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein can be executed. For example, the instructions 916 can cause the machine 900 to execute the flow diagrams of FIGS. 4-8. Additionally, or alternatively, the instruction 916 can implement the pool connection engine 205, pool metrics engine 207, wait time engine 210, load level engine 220, throttle engine 230, magnitude violation engine 240, frequency violation engine 250, and so forth. The instructions 916 transform the general, non-programmed machine into a particular machine programmed to carry out the described and illustrated functions in the manner described. In alternative example embodiments, the machine 900 operates as a standalone device or can be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 can include processors 910, memory/storage 930, and input/output (I/O) components 950, which can be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 912 and processor 914 that may execute instructions 916. The term "processor" is intended to include multi-core processor that may comprise two or more independent processors (sometimes referred to as "cores") that can execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory/storage 930 can include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 can also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of the processors 910 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 can include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 can include output components 952 and input components 954. The output components 952 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 950 can include biometric components 956, motion components 958, environmental components 960, or position components 962 among a wide array of other components. For example, the biometric components 956 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 can include acceleration sensor components (e.g., an accelerometer), gravitation sensor components, rotation sensor components (e.g., a gyroscope), and so forth. The environmental components 960 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or other suitable device to interface with the network 980. In further examples, communication components 964 include wired communication components, wireless communication components, cellular communication components, Near Field Communication (NFC) components. BLUETOOTH® components (e.g., BLUETOOTH® Low Energy), WI-FI® components, and other communication components to provide communication via other modalities. The devices 970 may be another machine or any of a wide variety of peripheral devices (e.g., a peripheral device coupled via a Universal Serial Bus (USB)).

Moreover, the communication components 964 can detect identifiers or include components operable to detect identifiers. For example, the communication components 964 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 980 can be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or other type of cellular or wireless coupling. In this example, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 can be transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, the instructions 916 can be transmitted or received using a transmission medium via the coupling 972 (e.g., a peer-to-peer coupling) to devices 970. The term "transmission medium" shall be taken to include any intangible medium that is capable of storing, encoding, or carrying the instructions 916 for execution by the machine 900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these example embodiments without departing from the broader scope of example embodiments of the present disclosure. Such example embodiments of the inventive subject matter may be referred to herein, individually or collectively, by the term "invention" merely for convenience and without intending to voluntarily limit the scope of this application to any single disclosure or inventive concept if more than one is, in fact, disclosed.

The example embodiments illustrated herein are described in sufficient detail to enable those skilled in the art to practice the teachings disclosed. Other example embodiments may be used and derived therefrom, such that structural and logical substitutions and changes may be made without departing from the scope of this disclosure. The Detailed Description, therefore, is not to be taken in a limiting sense, and the scope of various example embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various example embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of example embodiments of the present disclosure as represented by the appended claims. The specification and drawings are, accordingly, to be regarded in an illustrative rather than a restrictive sense.

What is claimed is:

1. A computer-implemented method, comprising:
   accessing connection metrics for a database connection pool that includes a plurality of connections, the connection metrics describing past requests for one or more of the plurality of connections and wait time data associated with the past requests, the wait time data indicating, for each of the past requests, how long the past request waited before receiving one of the plurality of connections;
   receiving a plurality of connection requests for the database connection pool;
   determining a potential wait time for an additional connection request based on the connection metrics; and
   modifying a quantity of open connections in the plurality of connections based on the potential wait time, prior to receiving the additional connection request.

2. The computer-implemented method of claim 1, wherein the plurality of connections comprise a plurality of connections in use and modifying the quantity of open connections comprises adding a new open connection to the database connection pool.

3. The computer-implemented method of claim 2, further comprising monitoring performance of the database connection pool and removing the new open connection from the database connection pool responsive to identifying a problematic quality of service metric based on the monitoring.

4. The computer-implemented method of claim 2, wherein adding the new open connection to the database connection pool is performed responsive to determining that the potential wait time exceeds a threshold potential wait time.

5. The computer-implemented method of claim 1, wherein modifying the quantity of open connections in the plurality of connections based on the potential wait time comprises removing at least one open connection from the plurality of connections responsive to determining that the potential wait time is lower than a threshold wait time.

6. The computer-implemented method of claim 1, wherein the plurality of connections comprise a plurality of connections in use and modifying the quantity of open connections comprises terminating one of the plurality of connections in use.

7. The computer-implemented method of claim 1, wherein modifying the quantity of open connections is performed responsive to verifying that modifying the quantity of open connections will not surpass a limit for the database connection pool.

8. The computer-implemented method of claim 1, further comprising determining an optimal load level for the database connection pool, wherein modifying the quantity of open connections in the plurality of connections is further based on the optimal load level for the database connection pool.

9. The computer-implemented method of claim 1, further comprising identifying a quantity of the plurality of connection requests and ascertaining wait time data from the connection metrics a similar quantity of the past requests, wherein determining the potential wait time is based on the ascertained wait time data.

10. The computer-implemented method of claim 1, further comprising initiating at least one additional instance of a database to which the database connection pool is connected.

11. A system comprising:
one or more processors; and
a machine-readable medium storing instructions that are executable by the one or more processors to perform operations comprising:
   accessing connection metrics for a database connection pool that includes a plurality of connections, the connection metrics describing past requests for one or more of the plurality of connections and wait time data associated with the past requests, the wait time data indicating, for each of the past requests, how long the past request waited before receiving one of the plurality of connections;
   receiving a plurality of connection requests for the database connection pool;
   determining a potential wait time for an additional connection request based on the connection metrics; and
   modifying a quantity of open connections in the plurality of connections based on the potential wait time, prior to receiving the additional connection request.

12. The system of claim 11, wherein the plurality of connections comprise a plurality of connections in use and modifying the quantity of open connections comprises adding a new open connection to the database connection pool.

13. The system of claim 12, wherein adding the new open connection to the database connection pool is performed responsive to determining that the potential wait time exceeds a threshold potential wait time.

14. The system of claim 11, wherein modifying the quantity of open connections in the plurality of connections based on the potential wait time comprises removing at least one open connection from the plurality of connections responsive to determining that the potential wait time is lower than a threshold wait time.

15. The system of claim 11, wherein modifying the quantity of open connections is performed responsive to verifying that modifying the quantity of open connections will not surpass a limit for the database connection pool.

16. The system of claim 11, the operations further comprising determining an optimal load level for the database connection pool, wherein modifying the quantity of open connections in the plurality of connections is further based on the optimal load level for the database connection pool.

17. The system of claim 11, the operations further comprising identifying a quantity of the plurality of connection requests and ascertaining wait time data from the connection metrics a similar quantity of the past requests, wherein determining the potential wait time is based on the ascertained wait time data.

18. The system of claim 11, the operations further comprising initiating at least one additional instance of a database to which the database connection pool is connected.

19. A method implemented by at least one computing device, the method comprising:
   accessing connection metrics for a database connection pool that includes a plurality of connections, the connection metrics describing past requests for one or more of the plurality of connections and wait time data associated with the past requests, the wait time data indicating, for each of the past requests, how long the past request waited before receiving one of the plurality of connections;
   receiving a plurality of connection requests for the database connection pool;
   determining a potential wait time for an additional connection request based on the connection metrics; and
   prior to receiving the additional connection request, modifying a quantity of open connections in the plurality of connections by:
      adding a new open connection to the database connection pool responsive to determining that the potential wait time satisfies a threshold value; and
      removing at least one open connection from the plurality of connections responsive to determining that the potential wait time fails to satisfy the threshold value.

20. The method of claim 19, further comprising monitoring performance of the database connection pool and removing the new open connection from the database connection pool responsive to identifying a problematic quality of service metric based on the monitoring.

* * * * *